United States Patent
Bishop et al.

(10) Patent No.: US 9,942,347 B2
(45) Date of Patent: *Apr. 10, 2018

(54) DYNAMICALLY ADJUSTING MEDIA CONTENT CACHE SIZE

(71) Applicant: Amazon Technologies, Inc., Seattle, WA (US)

(72) Inventors: Nathan Riley Bishop, San Anselmo, CA (US); Erik Scott Carpenter, San Bruno, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/163,800

(22) Filed: May 25, 2016

(65) Prior Publication Data

US 2017/0279914 A1 Sep. 28, 2017

Related U.S. Application Data

(63) Continuation of application No. 13/887,579, filed on May 6, 2013, now Pat. No. 9,379,933.

(51) Int. Cl.
*H04L 12/24* (2006.01)
*H04L 29/08* (2006.01)
*H04L 29/06* (2006.01)

(52) U.S. Cl.
CPC ...... *H04L 67/2842* (2013.01); *H04L 41/0896* (2013.01); *H04L 65/4084* (2013.01); *H04L 65/80* (2013.01); *H04L 67/18* (2013.01)

(58) Field of Classification Search
CPC ...... H04L 67/2847–67/2852; H04L 28/06476; H04L 28/08; H04W 4/025
See application file for complete search history.

(56) References Cited

U.S. PATENT DOCUMENTS

| | | |
|---|---|---|
| 9,137,550 B1 | 9/2015 | Velummylum et al. |
| 2006/0047815 A1 | 3/2006 | Hamadi |
| 2008/0262667 A1 | 10/2008 | Otabe |
| 2014/0095943 A1 | 4/2014 | Kohlenberg et al. |

*Primary Examiner* — Wing F Chan
*Assistant Examiner* — Raji Krishnan
(74) *Attorney, Agent, or Firm* — Thomas | Horstemeyer, LLP

(57) ABSTRACT

Disclosed are various embodiments for dynamically adjusting the amount of media content to be cached by a client device streaming media from a streaming device. An initial amount of media content is transmitted for caching to the client device from the streaming device. The location of a client device can be used to determine a connectivity interruption probability between the client device and the streaming device. The amount of media content for caching on the client device is adjusted based on the connectivity interruption probability, and the adjusted amount of media content is transmitted to the client device.

20 Claims, 5 Drawing Sheets

DYNAMICALLY ADJUSTING MEDIA CONTENT CACHE SIZE

CROSS-REFERENCE TO RELATED APPLICATION

This application is a continuation of copending U.S. utility application entitled, "Dynamically Adjusting Media Content Cache Size," having Ser. No. 13/887,579, filed May 6, 2013, which is entirely incorporated herein by reference.

BACKGROUND

Services that provide streaming media content for playback on a user device typically cache a fixed size of media content on the user device. For example, when streaming audio content, the fixed size may be based on the number of songs, length of playback or size in bytes. However, there may be occasions when a user may encounter an area with poor network coverage which may cause a disruption of the media content stream once the cached media content is consumed following the disconnect.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to dynamically adjusting the amount of media content to transmit to a client device for caching during a media content steaming event based at least in part on the location of the client and known network coverage availability. The amount of media content transmitted to the client for caching purposes may not only be adjusted to prevent under-caching due to a potential loss in network coverage, but may also be adjusted to prevent over-caching when the network coverage is strong and unlikely to experience an interruption.

For example, if a future connectivity interruption is identified, the amount of media content cached may be adjusted to include enough data to support a seamless media experience during the moments of connectivity interruption. Additionally, even if a connectivity interruption is not identified and the network coverage is strong, bandwidth costs and licensing fees for downloading and playing media content may be reduced if the amount of media content transmitted is adjusted to include only the amount of streaming media content required.

Various embodiments in the present disclosure relate to identifying the location of the user, predicting a route of movement associated with the user, and comparing the location and/or predicted route of movement with known areas of network coverage in determining the appropriate amount of media content to transmit to a client for caching to prevent over-caching and/or under-caching and provide a more enjoyable media experience.

In the following discussion, a general description of the system and its components is provided, followed by a discussion of the operation of the same.

Figure 1A:
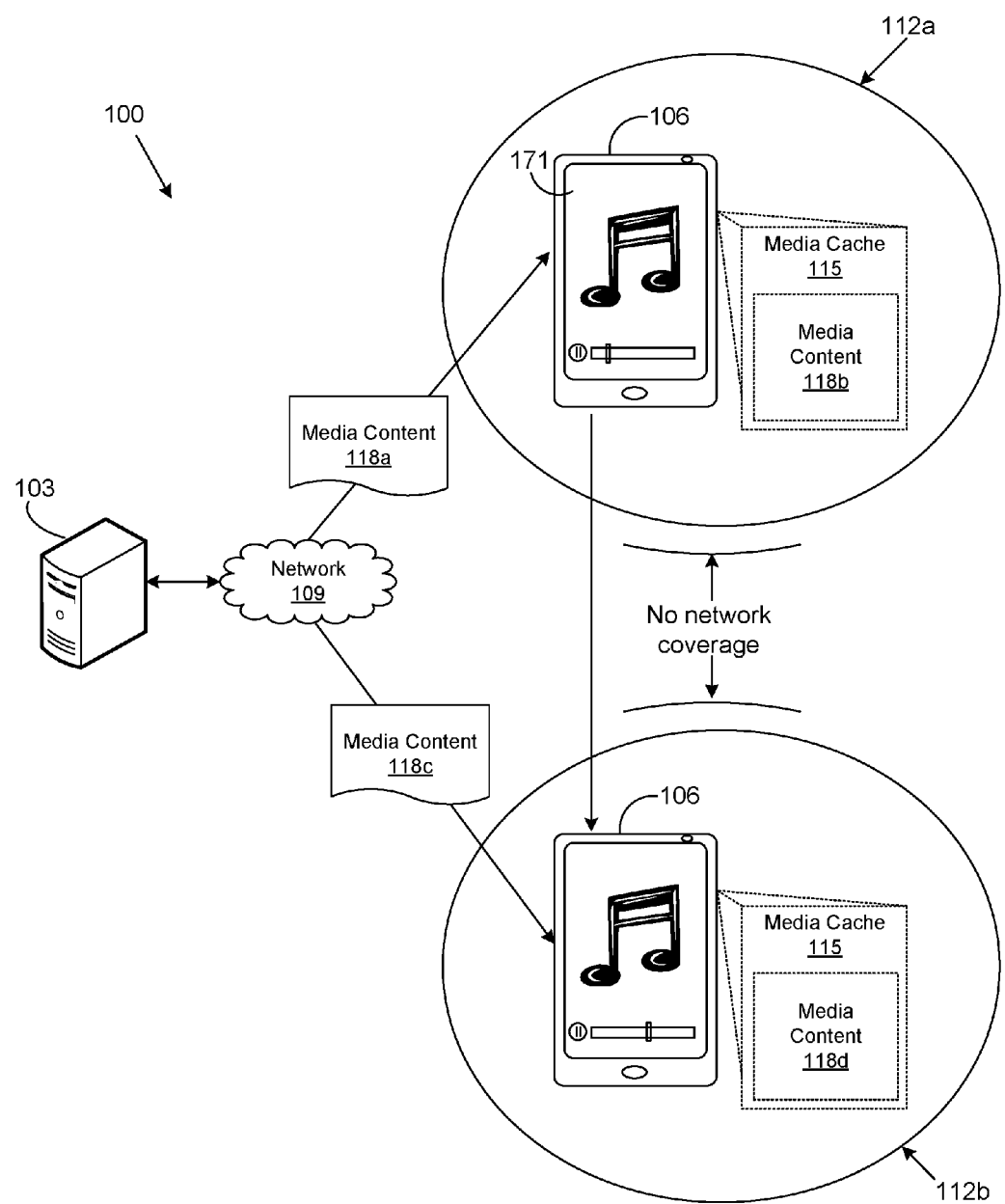
FIG. 1A is a drawing presenting one example of operation of a networked environment according to various embodiments of the present disclosure.

With reference to FIG. 1A, shown is one example of operation for a networked environment 100 according to various embodiments. The networked environment 100 includes a computing environment 103 in data communication with one or more clients 106 via a network 109. The client 106 is rendering a user interface 171 that allows a user to select and stream media content over the network 109.

The example in FIG. 1A demonstrates the movement of the client 106 from one network coverage area 112a through an area with no network coverage to another network coverage area 112b. During the time of movement, the computing device transmits media content 118a, 118c, to the client 106 during the various instances of time. The media content 118a, 118c transmitted may include one or more media content items and/or a portion of a media content item. The amount of media content 118a, 118c has been adjusted according to whether the client 106 may experience a future connectivity interruption. Additionally, the client 106 includes a media cache 115 that stores the received media content 118b, 118d prior to consumption by the user. Accordingly, in this example, the media content 118a that is being transmitted to the client 106 within the network coverage area 112a may include additional data other than the media content 118c that is being transmitted to the client 106 when the client 106 is within the network coverage area 112b since the client 106 in network coverage area 112a will travel through an area of no network coverage and thus experiences a connectivity interruption.

Figure 1B:
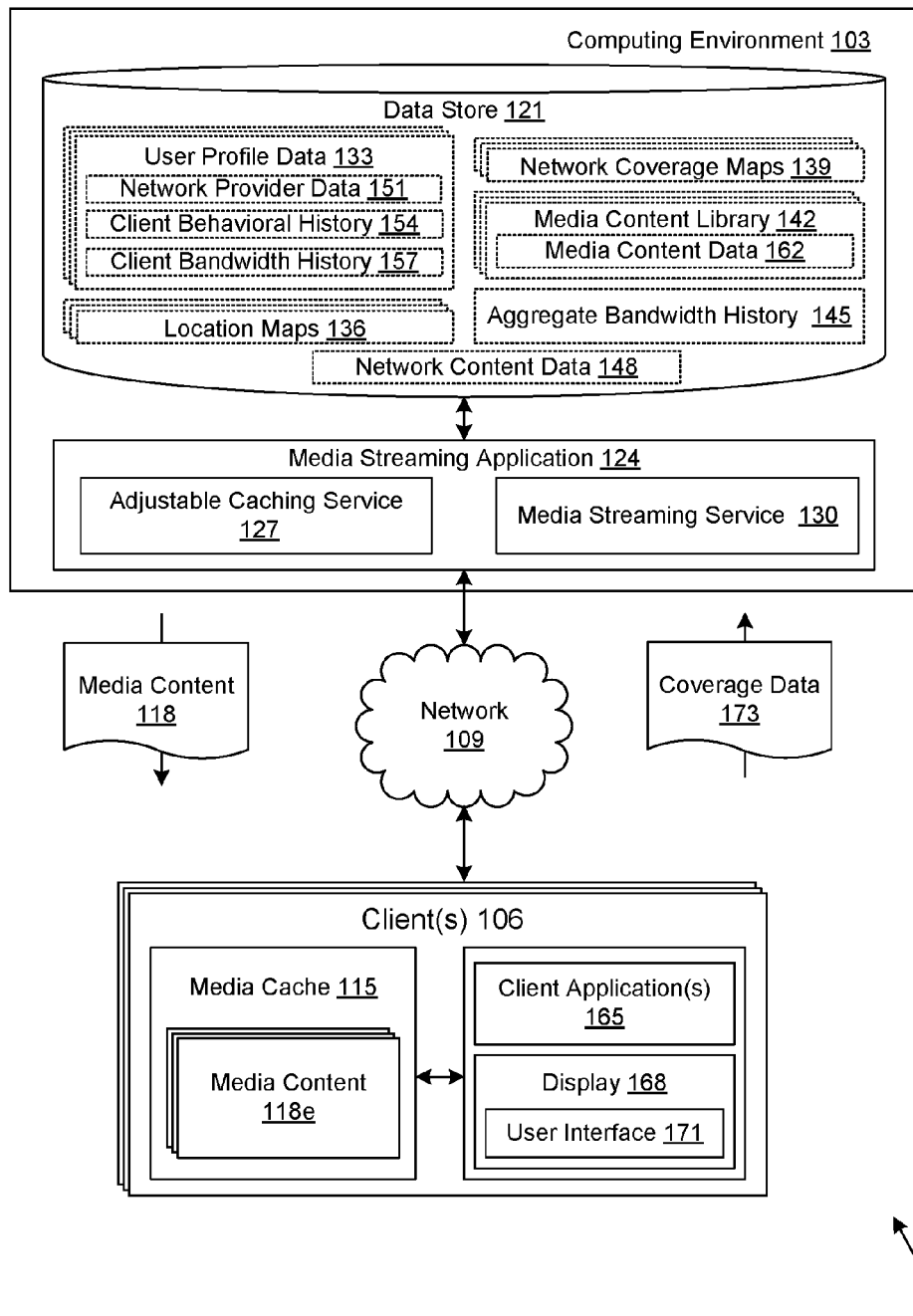
FIG. 1B is a drawing presenting a detailed view of the networked environment of FIG. 1A according to various embodiments of the present disclosure.

Turning now to FIG. 1B, shown is a detailed view of the networked environment 100 according to various embodiments. The networked environment 100 includes a computing environment 103 in data communication with one or more clients 106 via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 121 that is accessible to the computing environment 103. The data store 121 may be representative of a plurality of data stores 121 as can be appreciated. The data stored in the data store 121, for example, is associated with the operation of the various applications and/or functional entities described below.

The components executed on the computing environment 103, for example, include a media streaming application 124 that includes an adjustable caching service 127 and a media content streaming service 130. In addition, other applications, services, processes, systems, engines, or functionality may be implemented on the computing environment 103 that is not discussed in detail herein. The media streaming application 124 is executed to facilitate the creation of a media content streaming event, the streaming of media content, interaction during a media content streaming event and potentially other functions. The media streaming application 124 may also serve up network content, such as webpages or other network content that is encoded for rendering by clients 106.

The adjustable caching service 127 is executed to determine the amount of media content to transmit to the client 106 for caching in the media cache 115 for storage prior to playback. The adjustable caching service 127 may predict the likelihood of a network interruption during the streaming of the media content 118. Accordingly, the adjustable caching service 127 may adjust the amount of media content to transmit to the client 106 at a given instance. The media content streaming service 130 is executed to serve up or stream the media content 118 to the respective clients 106 to be rendered on the user interface 171.

The data stored in the data store 121 includes, for example, user profile data 133, location maps 136, network coverage maps 139, media content library 142, aggregate bandwidth history 145, network content data 148, and potentially other data. The user profile data 133 may include profile data relating to a user and/or clients 106 associated with the user. The user profile data 133 may include network provider data 151, client behavioral history 154, client bandwidth history 157, and/or other information.

The network provider data 151 may include data associated with the network provider associated with one or more clients 106 associated with the user. The network provider provides network access and bandwidth to the client's 106 associated with the user. Additionally, if the user employs multiple clients 106 then there may be multiple network providers associated with the different client devices 106. The client behavioral history 154 may include data with respect to prior locations, routes and times associated with user with respect to prior downloads and/or consumption of media content over a network 109. As such, the client behavioral history 154 may be able to reflect particular travel habits related to the user. The client bandwidth history 157 profiles the network bandwidth available for the user through the client 106. The client bandwidth history 157 may be employed when selecting the amount of media content to transmit to the client 106 for caching prior to playback. If the user employs multiple clients 106, multiple profiles may be created in the client bandwidth history 157. Also multiple location-dependent profiles may be created for clients 106 that are mobile devices.

For example, a user may have fourth-generation (4G) cellular data access at one location, but high-speed Wi-Fi data access at a second location, resulting in multiple location-dependent bandwidth profiles for the same client 106 in the client bandwidth history 157. Additionally, the client bandwidth history 157 may include information associated with the loss of network connection relating to mobile devices. For example, if a mobile device is known to be accessing data in a certain location using a type of wide area network (WAN) connection in a certain location, but the network coverage experiences a disconnect and/or interruption in the network connection, the client bandwidth history 157 may include data relating to the location of the loss of network coverage and the time of the disconnect and/or interruption.

The location maps 136 may include various maps and coordinates associated with various regions worldwide. The location maps 136 may be used when evaluating network disconnects in coverage from various client devices. Additionally, the location maps 136 may be used to predict routes of movement associated with a mobile client device 106. For example, obtained location points may be compared with the location maps 136 to predict a certain route of movement. The network coverage maps 139 may contain data relating to the wide area network (WAN) coverage maps according to various network providers. For example, AT&T®, SPRINT®, and VERIZON®, are all examples of network providers for various mobile devices. Accordingly, each of the network providers may offer various types of cellular data access for various areas world-wide. However, the coverage is not universal in that for each of the providers there may be coverage areas where the providers are unable to provide network access. Accordingly, there may be network coverage maps 139 associated with each of the network providers that may detail the strengths and weaknesses of network coverage for a given location. As such, the network coverage maps 139 may be employed in determining the likelihood of a network coverage interruption and/or disconnect.

Media content library 142 may comprise media content data 162. The media content data 162 comprises data that makes up a media content item including for example, movies, television shows, video clips, music, and/or other forms of media content. The media content 118 transmitted to the client 106 for caching in the media cache 115 is selected from the media content data 162. The media content 118 may comprise one or more media content items and/or a portion of a media content item. The aggregate bandwidth history 145 may include an aggregate representation of disconnects at certain locations experienced by various users and/or various client devices 106. For example, if multiple users experience a network disconnect associated with the same network provider in the same location, the aggregate bandwidth history 145 may include information relating to the location and the relating disconnects. However, if only a few users experience a disruption in network coverage in the location, then the aggregate bandwidth history 145 may reflect the unlikelihood of a disruption at that particular location for the particular service provider. Accordingly, the aggregate bandwidth history 145 may be employed for determining the likelihood of a network disconnect and/or interruption at a particular location.

Network content data 148 may include images, text, code, graphics, audio, video, and/or other content that may be served up by the media streaming application 124. To this end, network content data 148 may include static network content or static elements of network content, for example, in hypertext markup language (HTML), extensible markup language (XML), and/or any other language suitable for creating network content. Further network content data 148 may include code that generates dynamic network pages when executed or interpreted in the computing environment 103. Such code may be written in any suitable programming language, such as PHP, Perl, Objective C, Java, Ruby, etc. Network content data 148 may also include code configured to be executed or interpreted within a client 106 in order to render a dynamic network content. Such code may be referred to as applets and may be written in any suitable programming language, such as JavaScript, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 168. The display 168 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 165 and/or other applications. Also, various data stored is stored the media cache 115 that is accessible to the client 106. The data stored in the media cache 115, for example, is associated with the operation of the various applications and/or functional entities described below.

The client application 165 may be executed in a client 106, for example, to access network content served up by the computing environment 103 and/or other servers, thereby rendering a user interface 171 on the display 168. The client application 165 may, for example, correspond to a browser, a mobile application, media player application, etc., and the user interface 171 may correspond to a network page, a mobile application screen, etc. The client 106 may be configured to execute applications beyond the client application 165 such as, for example, mobile applications, email applications, social networking applications, and/or other applications.

The data stored in the media cache 115 includes, for example, media content 118*e*, and potentially other data. The media content 118*e* may include one or more media content items and/or a portion of a media content item that has been streamed to the client 106 via the media content streaming service 130 prior to playback on the client device 106. For example, when streaming media content, the media content streaming service 130 may provide additional media content 118 than what is needed for instantaneous playback. As such, the media content 118 received by the client 106 but are not currently being consumed may be stored in the media cache 115 prior to playback. Additionally, the media content 118 being transmitted to the client 106 may be an single media content item such as, for example, a song, or may be portion of a media content item such as, for example, a portion of a movie.

Additionally, the client may be configured to transmit coverage data 173 to the computing environment 103. The coverage data 173 may include various information relating to the current network access including, type of current network coverage, network provider information, bandwidth capabilities, loss of connection, current location of the client, and/or any other information related to the network access of the client 106.

Next, a general description of the operation of the various components of the networked environment 100 is provided. To begin, a user may stream media content, such as music, to his or her mobile client device 106. However, if the user is accessing the media content stream via a wide area network (WAN) connection, he or she may experience a disconnect and/or drop in network throughput at a particular location. When a disruption of network coverage occurs causing an effect on network throughput, the user may experience a frustrating loss during the playback of the media content stream. However, if the network disconnect can be predicted prior to occurrence based on the location of the client 106, streaming services, such as the media content streaming service 130, may transmit additional media content 118 to preload a media cache 115 on the client to avoid under-caching which could ultimately cause a disruption in the media content stream. Additionally, if the strength of the network access is strong and the likelihood of an interruption is low, the media content streaming service 130 may preload the media cache 115 with less media content 118 to prevent over-caching the media cache 115.

In various embodiments, a user may access a media streaming application 124 via a user interface 171 rendered by a client 106 associated with the user. The user may request to stream media content. Accordingly, the adjustable caching service 127 may determine the appropriate amount of the media content 118 to transmit for caching on the client 106 prior to instantaneous playback.

In some embodiments, the adjustable caching service 127 may obtain a location associated with the client device 106 requesting a media content stream. The location of the client device 106 may be obtained by requesting location coordinates (e.g. global positioning system (GPS) coordinates) from the client 106. The location of the client 106 may be used to determine the type of network access available to the client 106 as well as determine the network throughput for transmitting data over the network 109. Additionally, the adjustable caching service 127 may obtain network provider data 151 from the client 106 and/or from the user profile data 133 associated with the user requesting the media content.

In other embodiments, the adjustable caching service 127 may determine whether a client device 106 is currently moving. For example, the adjustable caching service 127 may be able to obtain a location of the client device 106 at different instances of time to determine whether there is a change in location. As such, the adjustable caching service 127 can detect mobility of the client device 106.

For example, assume a user is streaming audio to a mobile client device 106 during his or her drive to work. Further, assume that the client 106 is communicating with the computing environment 103 over a network 109 via fourth-generation (4G) cellular data access provided by a particular network provider. The adjustable caching service 127 may request either continually or intermittently location data from the client 106. Based on an evaluation with the received location data, the adjustable caching service 127 may determine whether the client device 106 requesting the media content stream is currently moving if the location data is different.

In addition, some embodiments of the adjustable caching service 127 may be able to predict a current route of movement of the user based at least in part on the received location data associated with the client device 106. For example, if the adjustable caching service 127 determines that the client device 106 is currently moving, the adjustable caching service 127 may compare the received data locations and corresponding times with location maps 136 available to predict a route of movement. Additionally, the adjustable caching service 127 may be able to predict a route of movement based on the client behavioral history 154. For example, the client behavioral history 154 may include data with respect to prior locations and times associated with user with respect to prior downloads and/or consumption of media content 118 over a network 109.

In other embodiments, the adjustable caching service 127 may use the location of the user and/or a predicted route of movement of the user to determine the probability of an interruption in network coverage. In one example, the adjustable caching service 127 may determine a probability of an interruption of network coverage based at least in part upon a comparison of the current location of the client device 106 and/or the predicted route of movement with the network coverage maps 139 associated with the network provider of the client device 106. The network provider information may be included in the coverage data 173 received from the client 106. Additionally, the network provider information may be obtained via the network provider data 151 included in the user profile data 133. Regardless, the adjustable caching service 127 may determine the probability of a network disconnect based on the current location and/or predicted route of movement.

For example, assume that the adjustable caching service 127 has predicted that the user is streaming media content on a particular route of movement based at least in part on a comparison of multiple obtained locations and the client behavioral history 154. Assume that the predicted route of movement involves the user traveling north on "Main St." in a particular city. Further assume that the network coverage map 139 associated with the network provider for the user's client device 106 identifies that there is no supported network coverage for a given distance (e.g. five miles) in the same direction once "Main St." intersects with "Green St." Accordingly, if the predicted route of movement includes the user continuing north on "Main St." past the "Green St." intersection, the adjustable caching service 127 may identify the lapse of network coverage is likely. As such, the adjustable caching service 127 may assign particular value (e.g. "0.9") reflecting the probability of a future connectivity interruption so that when compared to a coverage threshold value the adjustable caching service 127 would predict and interruption.

In another example, determining the likelihood of a connectivity interruption in network coverage may be based on a comparison of the current location of the user and/or predicted route of movement of the user and the client bandwidth history 157 and/or aggregate bandwidth history 145. For example, with respect to the client bandwidth history 157, the adjustable caching service 127 may be able to determine that the client 106 typically experiences a decrease or complete loss of network coverage at a particular time and/or location. For example, during a morning commute, the network throughput may be less than would be at a time with less traffic since more individuals would likely be using the network. As such, the adjustable caching service 127 may determine that based on the current time and current location of client device 106, a lapse in network connectivity is likely based on the client bandwidth history 157 associated with the client. Alternatively, the aggregate bandwidth history 145 may be used to determine the probability of a future connectivity interruption. Rather than focusing on the specific client device 106, the aggregate bandwidth history 145 may be used to identify common areas of connectivity interruptions based on detected losses from multiple client devices 106 associated with the same network provider.

Additionally, the adjustable caching service 127 may also be able to calculate the amount of time that the interruption would occur. For example, if the coverage lapse is within a five mile area then the adjustable caching service 127 may be able to determine the amount of time it would take for the user to re-enter network coverage based on the prior locations of the user, predicted route of movement and/or network coverage maps 139.

In other examples, the adjustable caching service 127 may determine that the probability of a network interruption is low and, therefore unlikely. For example, if the user is not determined to be mobile, and the network connection is a Wi-Fi connection, the loss of coverage would likely not occur. Additionally, if the user is traveling in a route that is entirely contained in a network coverage area 112a, 112b (FIG. 1A) according to the network coverage maps 139, the adjustable caching service 127 may determine that the probability of a network disconnect and/or other type of network coverage interruption is unlikely to occur.

Once the adjustable caching service 127 has evaluated the current state of network coverage for the client 106 receiving streaming media content, the adjustable caching service 127 may determine the amount of media content 118 to transmit to the client 106 for preloading to the media cache 115 prior to playback on the client. For example, if the probability of an interruption in the network coverage is high based on a comparison with a coverage threshold value, the adjustable caching service 127 may determine to preload the media cache 115 on the client with more data (e.g. multiple media content items) than would be transmitted if using a fixed size for caching. Conversely, if the likelihood of a disconnect of network coverage is low based on a comparison with a coverage threshold value, the adjustable caching service 127 may determine to preload the media cache 115 with less data than would be transmitted if using a fixed size for caching. For example, if the streaming media content is a movie and a future disruption of ten minutes is identified, the adjustable caching service 127 may determine the amount of data (e.g. number of bytes) with respect to the movie content that would be required to continue playback on the client 106 without interruption during the ten minutes of network disconnect. Likewise, if the streaming media content is an album including individual songs, the adjustable caching service 127 may determine the number of songs that would be needed to cover the time of network disconnect.

Other factors that may be considered by the adjustable caching service 127 in determining the amount of media content 118 to preload the media cache 115 located on the client 106 may include the current bandwidth profile associated with the client device 106, the time period associated with the possible connectivity interruption, and/or the available data storage on the client device 106 which may be determined via a request to the client 106.

Upon determining the amount of media content 118 to transmit to the client 106 for caching during a media streaming event, the adjustable caching service 127 may select a portion of the media content 118 to transmit from the media content requested based on the determined amount of media content 118 to transmit. Accordingly, if a large amount of media content 118 is required based on a future connectivity interruption, the adjustable caching service 127 may select a larger portion of media content 118 (e.g. larger number of media content items and/or number of bytes of a single media content item) to transmit for caching so that the user is provided a seamless media experience during any network coverage disconnect. Alternatively, if the network coverage is determined to be strong and unlikely to experience a connectivity interruption, the adjustable caching service 127 may select a small portion of media content 118 to transmit for caching. For example, the adjustable caching service 127 may select only one media content item or a minimum number of bytes associated with a single media content item based at least in part on the respective bandwidth available. This would decrease any bandwidth costs and/or licensing fees that the streaming service may endure with respect to media playback.

Figure 2:
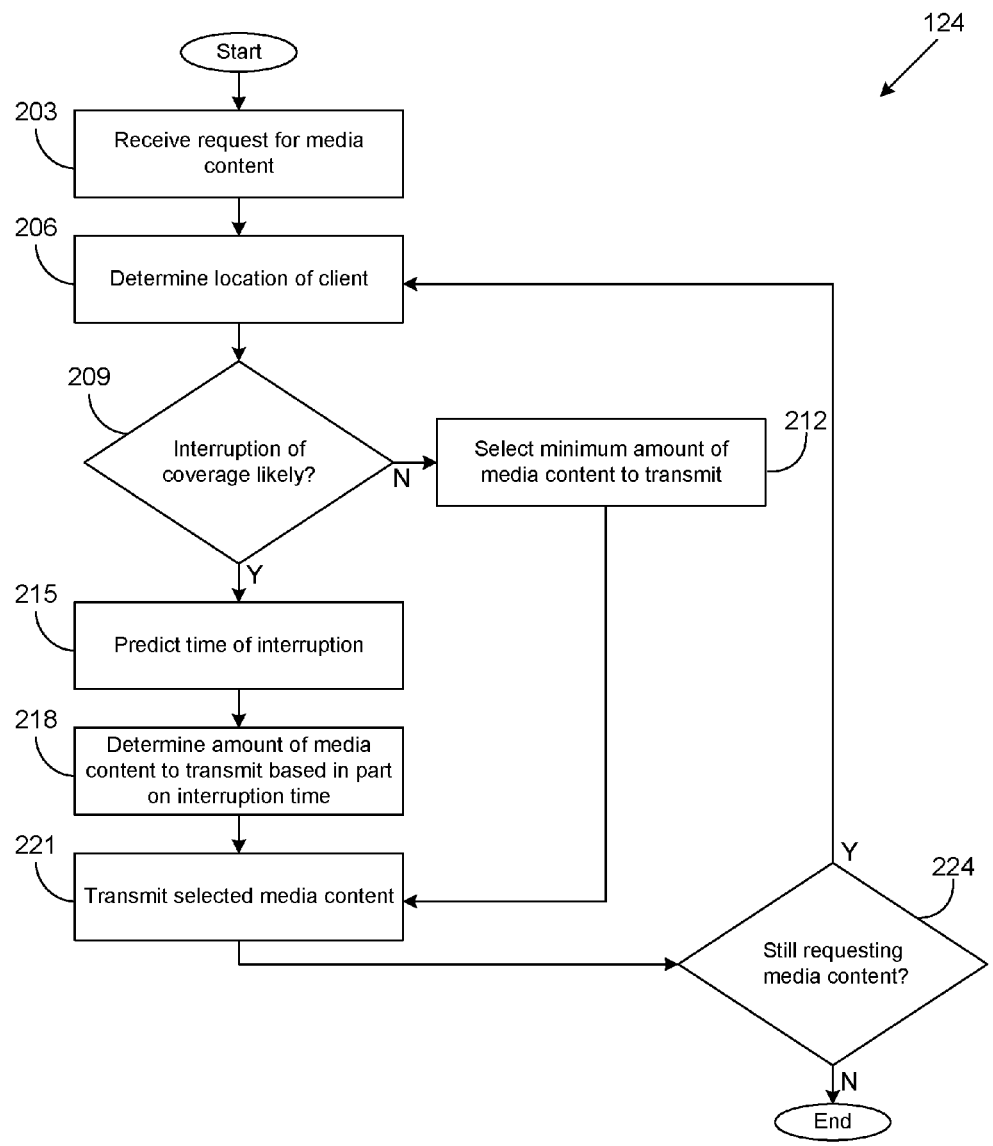
FIG. 2 is a flowchart illustrating one example of functionality implemented as portions of a media streaming application executed in a computing environment in the networked environment of FIG. 1B according to various embodiments of the present disclosure.

Referring next to FIG. 2, shown is a flowchart that provides one example of the operation of a portion of the media streaming application 124 according to various embodiments. It is understood that the flowchart of FIG. 2 provides merely an example of the many different types of functional arrangements that may be employed to implement the operation of the portion of the media streaming application 124 as described herein. As an alternative, the flowchart of FIG. 2 may be viewed as depicting an example of steps of a method implemented in the computing environment 103 (FIGS. 1A-1B) according to one or more embodiments.

Specifically, FIG. 2 relates to the process of streaming media content to a client 106. In particular, FIG. 2 relates to receiving a request for streaming media content to a user, determining the amount of data to preload on the client 106 associated with the user prior to playback, and ultimately selecting and transmitting the media content 118 to the user. Additionally, FIG. 2 illustrates the interactions between the media streaming application 124 with the adjustable caching service 127 and the media content streaming service 130.

Beginning with box 203, the media streaming application 124 receives a request for media from a client 106. The media streaming application 124 may serve up network content to be rendered by a client 106 to provide the capability for the user to interact with the media streaming application 124. As such, a user accessing a client application 165 on a client 106 may interact with the media streaming application 124 via a user interface 171 rendered by the client 106. Accordingly, the user may select to receive particular streaming media content data 162, such as, for example, a movie, an album, a webcast, etc. Upon receipt of the request to receive streaming media content, the media streaming application 124 proceeds to box 206.

In box 206, the media streaming application 124 via the adjustable caching service 127 determines the location of the client 106. In determining the location of the client 106, the adjustable caching service 127 may request location information from the client 106. The client 106 may provide the adjustable caching service 127 location data associated with the current location in the form of global positioning system (GPS) coordinates or other form of location identifier. Additionally, the adjustable caching service 127 may be able to determine whether the client 106 is moving based on a previously obtained location of the client 106. If the client 106 is determined to be moving, the adjustable caching service 127 may predict a route that the client is moving as discussed in more detail with respect to FIG. 3. Upon detection of the location of the client 106, the media streaming application 124 via the adjustable caching service 127 proceeds to box 209.

In box 209, the media streaming application 124 via the adjustable caching service 127 determines whether an interruption in coverage is likely. In some embodiments, the adjustable caching service 127 determines whether an interruption in coverage is likely based on a comparison of the current location of the client 106 with network coverage maps 139 related to various network providers. In other embodiments, the adjustable caching service 127 may compare the current location with the client bandwidth history 157 to determine whether the user has experienced a loss in available bandwidth or coverage altogether when accessing network content in the same location area.

Regardless of which approach the adjustable caching service 127 employs to discover potential connectivity interruptions, the adjustable caching service 127 may assign a probability value based on the results of the comparison of the location and the data that details gaps in network coverage. The probability value may be compared with a coverage threshold value to determine whether a connectivity interruption will occur. For example, if the user is at his or her home and is accessing network content via a Wi-Fi network service, then the likelihood of a network disconnect will be low. However, if the user is accessing the media content on a client device 106 via a 4G cellular service, the probability of a connectivity interruption may be high if the current location of the client device 106 is close to an area that is known to not provide network coverage. If the interruption of coverage is likely based at least in part on a comparison of the current location of the client 106 with known areas of network disconnect, the media streaming application 124 via the adjustable caching service 127 proceeds to box 215. Otherwise, the media streaming application 124 via the adjustable caching service 127 proceeds to box 212.

In box 212, the media streaming application 124 via the adjustable caching service 127 selects a minimum amount of media content 118 to transmit to the client 106 for preloading on the media cache 115 (FIGS. 1A and 1B). For example, if it is determined that the network coverage is good and the network throughput is high in the current location of the user then a minimal amount of data (e.g. one media content item and/or minimum number of bytes of a single media content item) would need to be transmitted for caching purposes in the media cache 115 on the client 106. For example, if the previous fixed amount of caching would have been two songs in an audio content environment, the adjustable caching service 127 may determine to only preload one song in the media cache 115 based on the strong network coverage detected. By evaluating factors such as the client bandwidth history 157, the client behavioral history 154, the aggregate bandwidth history 145 and/or other factors relating to data transfer over a network 109, the media streaming application 124 may select an amount of media content 118 that would avoid over-caching.

In box 215, the media streaming application 124 via the adjustable caching service 127 predicts the time of the interruption. By predicting the time of the interruption, the adjustable caching service 127 can determine the amount of time before the client loses network access as well as the length of time that the user will be without network access due to the lack of coverage. For example, if adjustable caching service 127 has predicted that the client will likely experience a future connectivity interruption based on the current location and/or predicted route of movement, the adjustable caching service 127 may determine from the network coverage maps 139 and/or the client bandwidth history 157 that the area lacks network coverage. For example, if the client 106 is moving in a direction towards a network gap for a certain distance (e.g. five miles), the adjustable caching service 127 may calculate the amount of time before the client experiences a disconnect in network coverage. Additionally, the adjustable caching service 127 may calculate the amount of time that it will take the user to re-enter a coverage area 112*a*, 112*b* (FIG. 1A) based on the distance of the gap of network coverage. Upon predicting the length of time that the user will be without network access, the media streaming application 124 via the adjustable caching service 127 proceeds to box 218.

In box 218, the media streaming application via the adjustable caching service 127 determines the amount of media content 118 to transmit to the client 106 for preloading the media cache 115 during the transmission of a media content stream. The amount of media content 118 to be transmitted to preload the media cache 115 on the client 106 may be based on a size in bytes, a length of playback, a number of songs if the media content is audio related, and/or other form of measurement for streaming data. Using the length of time that the connectivity interruption will occur, the adjustable caching service 127 may determine an amount of media content 118 to transmit to the client to preload in the media cache 115 prior to playback. Therefore, the amount of media content 118 transmitted for preloading to the media cache 115 may be dependent at least in part upon the amount of time that the client 106 fails to have network access. For example, if it is predicted that the client 106 will experience a connectivity interruption for five minutes based on its current location and the area of lack of network coverage, the amount of media content 118 may be smaller than if the time of connectivity interruption is twenty minutes.

Other factors that may also be considered in determining the amount of media content 118 to transmit for preloading the media cache prior to playback may include client bandwidth history 157, client behavioral history 154, aggregate bandwidth history 145, available data storage on the client reserved for caching of media content, and/or any other factor that may affect the amount of media content 118 to transmit to a client 106 to preload the media cache 115 prior to playback. Upon determining the amount of media content 118 to transmitted to the client 106 for preloading the media cache 115 prior to playback, the media streaming application 124 via the adjustable caching service 127 proceeds to box 221.

In box 221, the media streaming application 124 via the media content streaming service 130 transmits the selected media content 118 based on the amount of media content 118 to transmit to the client for preload caching in the media cache 115 prior to playback. Upon transmitting the media content 118 to the client 106, the media streaming application 124 proceeds to box 224.

In box 224, the media streaming application 124 determines whether the client 106 is still requesting a media content stream. For example, if the user is no longer streaming media content, the media streaming application 124 would determine that there is no longer a request for a media content stream. As such, the media streaming application 124 ends. Otherwise, the media streaming application 124 proceeds back to box 206.

Figure 3:
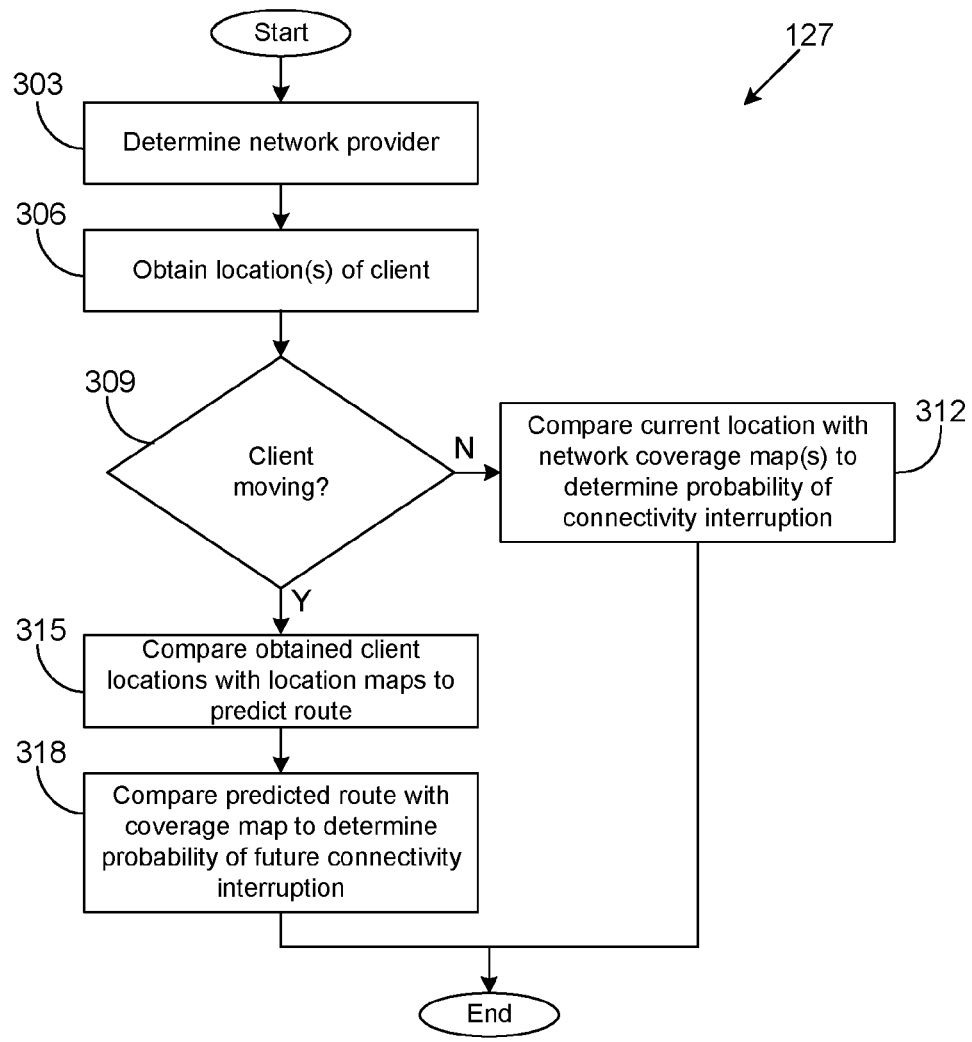
FIG. 3 is a flowchart illustrating one example of functionality implemented as portions of an adjustable caching service executed in a computing environment in the networked environment of FIG. 1B according to various embodiments of the present disclosure.

Moving on to FIG. 3, shown is a flowchart that provides one example of the operation of a portion of the adjustable caching service 127 according to various embodiments. It is understood that the flowchart of FIG. 3 provides merely an example of the many different types of functional arrangements that may be employed to implement the operation of the portion of the adjustable caching service 127 as described herein. As an alternative, the flowchart of FIG. 3 may be viewed as depicting an example of steps of a method implemented in the computing environment 103 (FIGS. 1A-1B) according to one or more embodiments.

Specifically, FIG. 3 relates to determining whether a connectivity interruption will occur based at least in part on the location of the client, a predicted route of the client if it is determined that the client 106 is moving, and known areas of lack in network coverage according to network coverage maps 139.

Beginning with box 303, the adjustable caching service 127 determines the network provider providing network access to the client 106. The network provider may be determined via coverage data 173 received from the client 106 following a request for coverage information. Alternatively, the adjustable caching service 127 may be able to obtain the network provider data 151 within the user profile data 133 included in the data store 121. Knowledge of the network provider may be needed in determining the stability of network coverage for the client 106 when receiving streaming media content 118. Upon obtaining the network provider information with respect to the client device 106, the adjustable caching service 127 proceeds to box 306.

In box 306, the adjustable caching service 127 obtains the location of the client 106. In obtaining the location of the client 106, the adjustable caching service 127 may request location coordinates associated with the current location of the client 106. Accordingly, the client 106 may send location coordinates (e.g. GPS coordinates) as well as the time at that location. Upon determining the current location of the client 106, the adjustable caching service 127 proceeds to box 309.

In box 309, the adjustable caching service 127 determines whether the client 106 is moving. For example, if the client 106 is a mobile device and the user is streaming media content on his or her way to work on his or her client 106, the adjustable caching service 127 may be able to determine that the client 106 is moving by requesting additional location information. Accordingly, the adjustable caching service 127 may compare the first location at a first instance with a second location obtained at a second instance and determine that the locations are not the same. If the adjustable caching service 127 determines that the client 106 is moving, the adjustable caching service 127 proceeds to box 315. Otherwise, the adjustable caching service 127 proceeds to box 312.

In box 312, the adjustable caching service 127 compares the current location of the client 106 with the network coverage map(s) 139 associated with the network provider providing network access to the client. By comparing the current location of the client 106 with the appropriate network coverage map(s) 139 the adjustable caching service 127 may be able to identify the strength of the network coverage and identify whether the current coverage is typically spotty or unpredictable. As such, the adjustable caching service 127 may determine the probability of a future connectivity interruption. For example, if it is determined upon the comparison of the current location and the applicable network coverage map(s) 139 that the user should not experience a decrease or loss of network coverage, the probability of a loss of network coverage would be low. To reflect the low probability of a further connectivity interruption, the adjustable caching service 127 may assign a low probability value that when compared with a coverage threshold value would reflect the low likelihood of a future connectivity interruption. However, if the coverage in the current location is determined to be spotty, then the adjustable caching service 127 may assign a probability value that would reflect a greater likelihood of a future connectivity interruption than when there is not a detection of spotty coverage. Upon comparing the current location of the client 106 with the applicable network coverage map(s) 139, the portion of the adjustable caching service 127 ends.

In one non-limiting example, the probability value may be calculated by determining a weighted sum that may be based on a variety of factors that may include the predicted route of movement, a prior loss of network connectivity, a routine of the user, and/or other factors. For example, assume that it is determined that a user is traveling in a particular direction. If the comparison of the predicted route of movement and the network coverage maps 139 show that the user will be traveling in an area not supported by the related network provider than the probability value may be assigned a weighted value (e.g. "1") that may reflect high likelihood of connectivity interruption. However, even if a comparison of the predicted route of movement and the network coverage maps 139 does not show a potential loss of network coverage, the client behavioral history 154 may identify that the predicted route of movement is part of the user's daily routine and the client bandwidth history 157 may identify a frequent loss of network coverage. As such, the weighted value may not be as high as when the network coverage maps 139 identified a loss of network coverage, but may still be assigned a lower weighted value (e.g. "0.7") to reflect the possibility of a connectivity interruption based on the client bandwidth history 157 and/or the client behavioral history 154.

In box 315, the adjustable caching service 127 compares the obtained client locations used to determine whether the client 106 was moving with the location maps 136 to predict a route. For example, using the location data points and comparing them with an appropriate location map, a direction of the client may be obtained. As such, if the user is at location "A" at a first instance and at location "B" at a second instance, the adjustable caching service 127 may determine a direction of the client and predict the next location of the client. In other examples, the adjustable caching service 127 may also evaluate the client behavioral history 154 to determine whether there is any known route including the same data locations that the user travels when accessing media content. As such, the adjustable caching service 127 may predict a route of the user based on the obtained data locations. Upon predicting a route associated the moving client 106, the adjustable caching service 127 proceeds to box 318.

In box 318, the adjustable caching service 127 compares the predicted route with the network coverage map(s) 139 associated with the network provider providing network access to the client. By comparing the predicted route with the applicable network coverage map(s) 139, the adjustable caching service 127 may determine whether the route enters in an area that is known to have a decrease or lack of network coverage according to the network coverage map(s) 139. Alternatively, the comparison may indicate whether the user will travel through an area maintains network coverage with high bandwidth. Upon comparing the predicted route with the applicable network coverage map(s) 139, the adjustable caching service 127 may determine the probability of a future connectivity interruption. Accordingly, as discussed above, the adjustable caching service 127 may assign a probability value that reflects the probability of a further connectivity interruption at the given client location. Thus, if it is determined upon the comparison of the predicted route and the applicable network coverage map(s) 139 that the user should not experience a decrease or loss of network coverage, the probability of a loss of network coverage would be low.

Alternatively, if the coverage in the current location is determined to be spotty or non-existent in the near future, then the adjustable caching service 127 may assign a probability value that would reflect a greater likelihood of a future connectivity interruption than when there is not a detection of spotty coverage or loss of coverage. Upon comparing the predicted route with the applicable network coverage map(s) 139, the adjustable caching service 127 ends.

Figure 4:
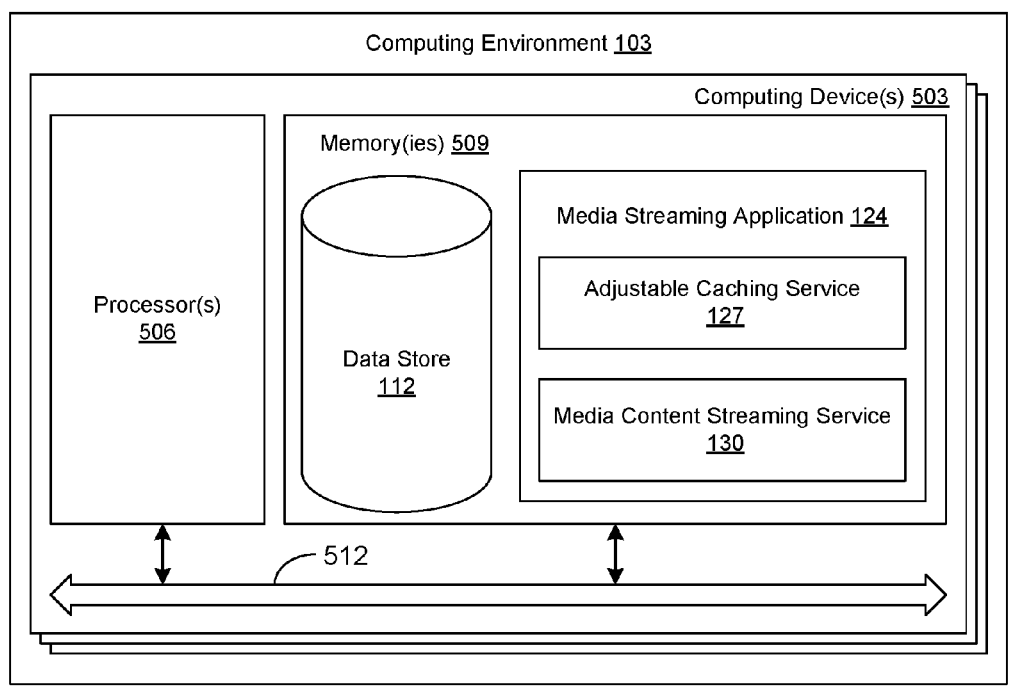
FIG. 4 is a schematic block diagram that provides one example illustration of a computing environment employed in the networked environment of FIGS. 1A and 1B according to various embodiments of the present disclosure.

With reference to FIG. 4, shown is a schematic block diagram of the computing environment 103 according to an embodiment of the present disclosure. The computing environment 103 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 are a media streaming application 124, an adjustable caching service 127, a media content streaming service 130, and potentially other applications. Also stored in the memory 509 may be a data store 121 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although the media streaming application 124, the adjustable caching service 127, the media content streaming service 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the media streaming application 124 and adjustable caching service 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media streaming application 124, the adjustable caching service 127, and the media content streaming service 130, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   initiating, via at least one computing device, a transmission of media content to a client device;
   transmitting, via the at least one computing device, an initial amount of the media content for caching via the client device;
   determining, via the at least one computing device, a connectivity interruption probability between the client device and the at least one computing device based at least in part on a location of the client device and a bandwidth history associated with the location of the client device;
   determining, via the at least one computing device, that the initial amount of the media content for caching is to be adjusted based at least in part on a comparison of the connectivity interruption probability with a predefined probability threshold;

determining, via the at least one computing device, an adjusted amount of the media content to be transmitted for caching according to an estimated duration of interruption; and transmitting, via the at least one computing device, the adjusted amount of the media content to the client device.

2. The method of claim 1, further comprising, receiving, via the at least one computing device, a request from the client device to initiate the transmission of the media content to the client device.

3. The method of claim 1, wherein
the adjusted amount of the media content is greater than the initial amount when the connectivity interruption probability is greater than the predefined probability threshold; and
the adjusted amount of the media content is less than the initial amount when the connectivity interruption probability is less than the predefined probability threshold.

4. The method of claim 1, wherein the adjusted amount of media content is further based at least in part on an amount of available storage on the client device.

5. The method of claim 1, wherein the connectivity interruption probability is further based at least in part on behavior history data associated with the client device.

6. The method of claim 1, wherein the location is a first location of the client device at a first instance, and further comprising predicting, via the at least one computing device, a route of movement of the client device based at least in part on the first location and a second location of the client device at a second instance.

7. The method of claim 6, wherein the connectivity interruption probability is further based at least in part on a comparison of the route of movement with a network coverage map.

8. A system, comprising:
at least one computing device; and
at least one application executable by the at least one computing device, wherein, when executed, the at least one application causes the at least one computing device to at least:
initiate a transmission of a media content stream to a client device;
transmit an initial amount of the media content stream for caching by the client device prior to playback of the media content stream by the client device;
determine a connectivity interruption probability between the client device and the at least one computing device based at least in part on a route of movement of the client device, a network connectivity history, and a bandwidth profile associated with the route of movement;
determine that an alternate amount of the media content stream is to be transmitted to the client device for caching based at least in part on a comparison of the connectivity interruption probability and a probability threshold;
determine the alternate amount based at least in part on an estimated interruption duration; and
transmit the alternate amount of the media content stream to the client device.

9. The system of claim 8, wherein, when executed, the at least one application further causes the at least one computing device to at least predict the route of movement associated with the client device based at least in part on a first location of the client device, a second location of the client device, and a route history.

10. The system of claim 8, wherein
the alternate amount of the media content is greater than the initial amount when the connectivity interruption probability is greater than the probability threshold; and
the alternate amount of the media content is less than the initial amount when the connectivity interruption probability is less than the probability threshold.

11. The system of claim 8, wherein, when executed, the at least one application further causes the at least one computing device to at least receive coverage data from the client device, the coverage data comprising at least one of a network coverage type of the client device, network provider information, or a bandwidth capability.

12. The system of claim 11, wherein the connectivity interruption probability is further based at least in part on the coverage data.

13. The system of claim 8, wherein, when executed, the at least one application further causes the at least one computing device to at least select a portion of the media content stream to transmit to the client device based at least in part on the alternate amount.

14. The system of claim 13, wherein the alternate amount of the media content stream corresponds to at least one of a size in bytes, a playback length, or a number of tracks.

15. A non-transitory computer-readable medium embodying a program executable in at least one computing device, wherein, when executed, the program causes the at least one computing device to at least:
initiate a transmission of a media content stream to a client device; transmit an initial amount of a media content stream to the client device;
determine a connectivity interruption probability between the client device and the at least one computing device based at least in part on a location of the client device and a bandwidth history associated with the location of the client device;
determine an alternate amount of the media content stream to be transmitted for caching based at least in part on a comparison of the connectivity interruption probability with a predefined threshold and an estimated duration of interruption; and
transmit the alternate amount of the media content stream to the client device.

16. The non-transitory computer-readable medium of claim 15, wherein, when executed, the program causes the at least one computing device to at least select a portion of the media content stream to transmit to the client device based at least in part on the alternate amount.

17. The non-transitory computer-readable medium of claim 15, wherein, when executed, the program causes the at least one computing device to at least receive a request from the client device to initiate the transmission of the media content stream.

18. The non-transitory computer-readable medium of claim 15, wherein, when executed, the program causes the at least one computing device to calculate the estimated duration of interruption.

19. The non-transitory computer-readable medium of claim 18, wherein calculating the estimated duration of interruption is based at least in part on a distance of a lapse of network coverage in a network coverage map.

20. The non-transitory computer-readable medium of claim 15, wherein determining the alternate amount is further based at least in part on an amount of available storage in the client device.

* * * * *